June 27, 1967    G. F. KEELERIC    3,327,382
HONEYCOMB MANUFACTURING PROCESS
Filed May 15, 1964
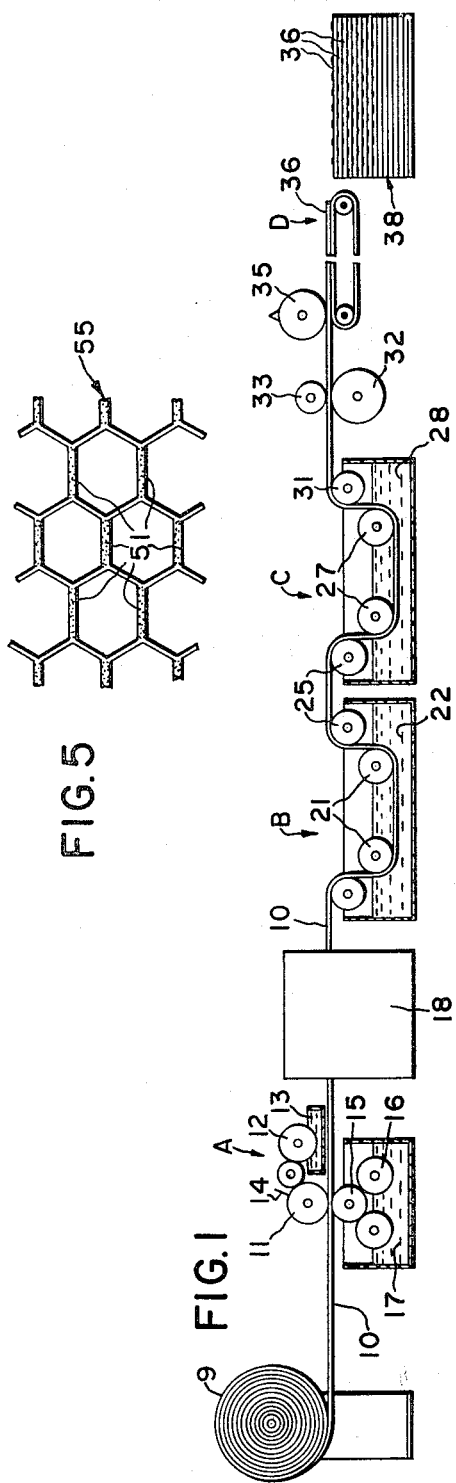
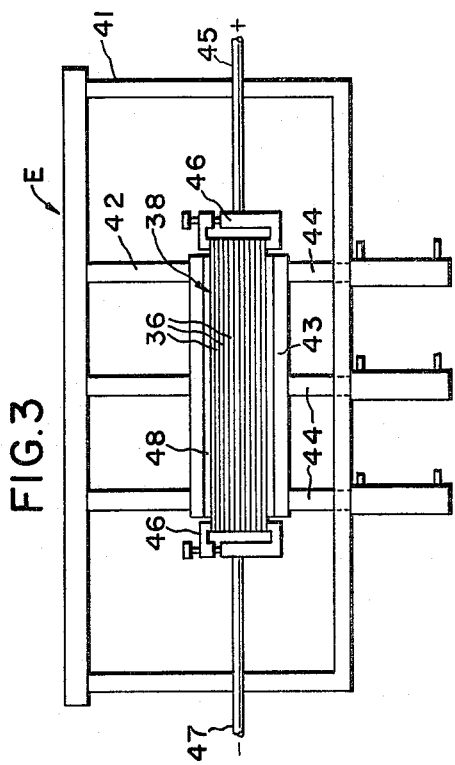
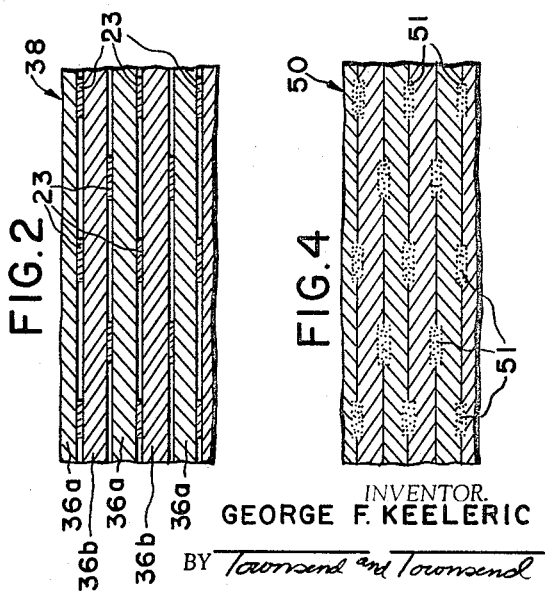
INVENTOR.
GEORGE F. KEELERIC
BY *Townsend and Townsend*
ATTORNEYS

United States Patent Office

3,327,382
Patented June 27, 1967

3,327,382
HONEYCOMB MANUFACTURING PROCESS
George F. Keeleric, Big Sur, Monterey County,
Calif. 93920
Filed May 15, 1964, Ser. No. 367,819
4 Claims. (Cl. 29—471.1)

The present invention relates in general to a honeycomb manufacturing process for fabrication of honeycomb core structures.

Broadly stated, the present invention, to be described in greater detail below, is directed to a method of making honeycomb core which includes the steps of first electroplating a plurality of spaced parallel nodes or lines of an interface metal on at least one face of a large number of foils and then stacking the foils so that the surface of each node contacts the superposed foil preferably with the nodes between successive foils staggered with respect to one another. The interface material is a metal dissimilar to the metal of the foils. The stack of foils is subjected to heat and pressure to weld the contacting node and foil surfaces to form an unexpanded pack of material without appreciable attenuation of the foil material. If the position of the nodes is staggered between successive pairs of foils, the unexpanded pack of material is a block of honeycomb before expansion.

The interface material is provided to a thickness whereby upon application of a proper amount of heat and pressure to the stack the interface material diffuses into the adjacent foils and produces a diffusion bond between the adjacent foils at a temperature and pressure considerably below the temperature and pressure necessary to produce a diffusion bond in absence of the interface material. The diffusion bond created is a substantially continuous solid solution of foil metal rich in the interface material.

One previous method of constructing honeycomb as described in British Patent No. 836,162, issued to A. V. Roe & Company, Ltd., is to lay a set of strips of brazing material across a sheet or foil, then to position thereon successive sheets and staggered sets of strips, and then to place the stack of sheets in a brazing oven to effect a braze between adjacent sheets in the regions occupied by the brazing strips.

One advantage of the present invention over the method according to this British patent is that in accordance with the present invention the interface metal is positively located by being metallically bonded to the sheets or foils so that there is positive registration between the interface metal and at least one of the adjacent foils to properly maintain the position of the several nodes of interface metal until the bonding operation takes place. Also, the electroplated interface metal is in intimate contact with the metal foils thereby insuring that a good diffusion bond will be produced.

Additionally in accordance with the present invention the properties of the bond created between adjacent foils at the node regions are substantially those of the foils themselves so that the strength of the resultant honeycomb and the environments in which it can be used are not limited by the properties of a bond material as is the case where a normal braze is produced between two high melting point metals.

Another method of manufacturing a honeycomb with high strength-temperature characteristics is described in my copending patent application entitled "Honeycomb Core and Method of Making Same," Ser. No. 666,383, filed June 18, 1957, now Patent No. 3,200,489, wherein I teach the method of fabricating honeycomb structures of such materials as stainless steel by first providing a stop-weld or stop-off material on the foils in the regions between the node areas and then applying heat and pressure to create a diffusion bond directly between the foils in the node regions in between the areas of stop-weld material. While this method is quite satisfactory, there are inherent difficulties in applying and removing the stop-weld material, and under certain circumstances it becomes desirable to provide an increased thickness to the foils at the node regions to insure that good diffusion bonds are created at these regions. Additionally, it has been discovered that the temperatures and pressure necessary to produce a diffusion bond in many materials such as, for example, molybdenum deleteriously affect the strength properties of the metal.

The present invention eliminates the necessity for the application and removal of the stop weld in between node regions and also produces a diffusion bond between foils, substantially as strong as the foil material, at temperatures and pressures considerably lower than those required to diffusion bond the foils in the absence of a dissimilar interface metal. Thus, by utilizing a lower temperature, changes in the properties and physical characteristics of the materials being bonded such as, for example, annealing of the materials which often takes place at normal diffusion bonding temperatures, are avoided. Additionally with the provision of the interface metal an increased thickness is provided at the node regions so as to concentrate at the node regions the pressure forces which are applied to the stack of sheets thereby to insure intimate contact between foils primarily at the node regions for production of the diffusion bond at this location.

Other objects of the present invention will become apparent upon reading the following specification and referring to the accompanying drawings in which similar characters of reference represent corresponding parts in each of the several views.

In the drawings:

FIG. 1 is a diagrammatic view of a machine suitable for electroplating dissimilar interface metal onto sheets of web material;

FIG. 2 is a side cross-sectional view of a stack of sheets to which interface metal has been applied;

FIG. 3 is a schematic view illustrating apparatus useful for establishing the bonds between sheets;

FIG. 4 is a side cross-sectional view of a stack of bonded sheets; and

FIG. 5 is an elevational view of an expanded honeycomb structure constructed in accordance with the present invention.

Referring now to the drawing with particular reference to FIGS. 1 and 3, there is shown certain apparatus which can be utilized to practice the present invention. The apparatus includes a masking assembly A, an electroplating assembly B, a mask removal assembly C, a cutting and stacking assembly D, and a compression and heating assembly E.

In the masking assembly A masking material is applied to a web of metal foil 10 drawn from a roll of web material 9. The web 10 can be any material desired for the final honeycomb such as, for example, aluminum, copper, stainless steel, or refractory metals such as molybdenum and columbium and which is capable of being electroplated so that a diffusion bond can be coated as set forth in greater detail below. Naturally, the particular masking material utilized must be appropriate for the particular web material and the particular interface metal, but petroleum resins such as, for example, coumaron-indene are suitable for most all combinations of foil and interface metals. Where only small quantities of bonded honeycomb are desired I have found that certain types of pressure sensitive tape such as, for example, 3-M No. 470 can be used to mask the foil.

The masking material is applied to the top side of the web 10 by a rotogravure roller 11 provided with printing regions which extend substantially the length of the roller 11 and are spaced apart around its outer surface by a distance equal to the node width of the honeycomb produced. The masking material is applied to the printing regions of the rotogravure roller 11 by a pick-up roller 12 which is in rolling contact with the rotogravure roller 11 and is partially immersed in a reservoir 13 of the masking material. A doctor knife 14 in contact with the surface of the rotogravure roller 11 removes masking material from the node regions in between the printing regions on the roller surface. As the rotogravure roller 11 rotates in contact with the web 10 masking material is applied to the top surface of the web 10 in spaced apart regions leaving therebetween narrow node regions 23 free of masking material and extending the width of the web material.

On the bottom side of the web 10 a continuous coating of masking material is applied by an application roller 15 in rolling contact with a pick-up roller 16 which is partially immersed in a reservoir 17 containing the masking material. The coated web material 10 passes from the masking assembly A to the electroplating assembly B, and if necessary a masking material drying oven 18 can be provided between these stages to insure that the masking material is dry before the web material reaches the electroplating assembly B.

In the electroplating assembly B the web material passes over a pair of idler rollers 21 which immerse the web 10 in an electroplating bath 22 for electroplating on the non-masked or node regions 23 an interface metal which is dissimilar to the metal of the web 10 but appropriate to the particular web metal for electroplating and for creating the diffusion bond such as described below.

Typical examples of web and plating metals for honeycomb produced in accordance with this invention are stainless steel plated with iron or nickel, copper plated with zinc, and aluminum, beryllium or thoria dispersed nickel plated with copper. While it is realized that attempts are being made to electroplate refractory metals such as molybdenum and columbium with dissimilar metals such as, for example, titanium, and that under the present state of the art the electroplating of such refractory metals is difficult, if not virtually impossible, the scope of the present invention is intended to encompass the electroplating of a dissimilar interface metal to any type of metal capable of being so electroplated. Since the present invention is applicable to metal alloys as well as pure metals, the word "metal" is used hereinabove and hereinafter and in the claims as including pure metals and metal alloys unless otherwise specified.

From the electroplating assembly A the web is conveyed over a pair of idler rollers 25 to the mask removal assembly C which includes a pair of idler rollers 27 which direct the web 10 into a bath 28 of mask solvent solution in which the masking material applied to the top and bottom surfaces of the web by the gravure roller 11 and the application roller 15, respectively, is removed leaving only the electroplated node areas 23 on the top surface of the web. Typical solvents for the coumaron-indene masking materials mentioned above are ketones, chlorinated hydrocarbons and the like. Under certain conditions it may be desirable to leave the masking material on the web material during the bonding stage.

From the mask removing assembly C the web is directed over an idler roller 31 to the cutting and stacking assembly D by a motor driven roller 32 which is held in contact with the web material by a back-up roller 33 and which pulls the web 10 from the roll of web material 9 through the preceding assemblies.

In the cutting and stacking assembly D the web material 10 is cut into foils or sheets 36 by a cutting roller 35, and these foils or sheets 36 are conveyed via a continuous conveyor 37 to a stacking assembly at which these sheets are stacked so that the electroplated node regions 23 are staggered throughout the stack in the manner illustrated in FIG. 2.

Referring now to FIG. 2, there is shown an enlarged portion of the stack 38 of sheets 36 in which alternate foils or sheets 36a and 36b are positioned with respect to one another so that the electroplated node region 23 on their face surfaces are aligned parallel but staggered with respect to one another, the node regions 23 on the sheet 36a being positioned substantially intermediate the node regions 23 on sheet 36b. This stack 38 of properly arranged sheets 36 is positioned in the compression and heating assembly E illustrated in FIG. 3 to produce the desired diffusion bonds as described in detail below.

While the application of the electroplated interface metal has been described by way of example as applied to only one side of a web of material, it is obvious that the interface metal can be applied to both sides of the web, in which case the positions of the areas at which the brazing material is applied should be staggered on opposite sides of the web. When sheets which have been coated on both sides in this manner are stacked for the production of honeycomb, areas of interface metal on adjacent sheets will abut one another. This method insures intimate contact between the interface metal and both of the sheets between which a diffusion bond is desired, and the thickness of the brazing material electroplated onto the sheets can be approximately half the thickness which is applied in the method described above with respect to the drawings.

Obviously, many other techniques for electroplating interface metal only at the nodal regions can be utilized. For example, a masking material can be applied uniformly over the entire web of material and removed only in those regions at which it is desired to electroplate. Alternatively, a coat of interface metal can be uniformly electroplated over the entire surface of the web and then removed in the antinodal regions or in the areas between the nodes.

Referring now to FIG. 3, there is schematically illustrated one compression and heating assembly B for accomplishing the present invention. The assembly includes an enclosure 41 which can be referred to generally as a furnace or oven and within which the atmosphere can be controlled by evacuating air from the enclosure or by the introduction into the chamber of an inert gas atmosphere. Whether or not a controlled atmosphere is necessary or desirable depends upon the type of metal being welded. Generally, I regard it advisable to weld in an oxygen-free and/or otherwise contaminant-free condition in working with metals such as stainless steel, aluminum or some of the more exotic metals such as titanium alloys, etc. Other less reactive metals such as, for example, copper, can be welded in an air atmosphere.

The stack 38 of sheets 36 to be welded is physically compressed within the enclosure 41 between a stationary press bed 42 and a movable press platen 43. The platen 43 is forced toward the bed 42 by means of hydraulic rams 44, there being no illustration of the source of hydraulic pressure and controls for the rams 44 since there is known and understood apparatus available for such purposes.

The method of heating the stack 38 within the press to welding temperature is largely a matter of choice or design and, again, depends to some extent upon the type and physical characteristics of the metal sheets or foils to be welded. For example, in welding foils of electrically non-resistant character, such as, for example, copper, it is feasible to employ resistance element strip heaters placed at the top and bottom of the stack within the press whereby heat from the strip heaters will be transferred by conduction to all of the sheets in the stack.

When the stack 38 is made up of sheets having a fairly high degree of electrical resistance such as, for example, stainless steel sheets, the stack 38 itself can be employed as a resistance heater per se by passing current directly through the stack from one end thereof to the other. Thus, for example, in FIG. 3, the stack 38 is electrically and thermally insulated from the press bed 42 and press platen 43 by sheets of insulating material 48. The stack 38 is heated electrically by passing a current from a source 45, through clamps 46 attached to opposite ends of the stack 38, and then to ground 47.

To accomplish the diffusion weld utilizing the electroplated dissimilar interface metal nodes 23, in accordance with the present invention, the pressure and heat required to be applied in the compression and heating assembly E naturally depends upon the particular materials being welded and the particular interface metal utilized. Specific examples will be set forth hereinafter. However, it can be generally stated that the specific heat and pressure necessary under a particular set of conditions will be considerably less than the heat and pressure necessary to produce a diffusion weld between the separate sheets of the stack in absence of the electroplated interface metal nodes.

When a stack of sheets has been welded and removed from the assembly E such as the portion of the welded stack 50 shown in FIG. 4, diffusion welds 51 are achieved substantially only at the nodal regions without any appreciable welding in the antinodal regions or, stated otherwise, in the areas in between the initially electroplated areas of interface metal. Typically, the diffusion welds 51 include the dispersion of the interface metal into the adjacent sheets 36 as well as a diffusion of the metal from the separate sheets at the nodal regions into one another. The interface metal works somewhat in the manner of a localized catalyst to enable production of a diffusion weld at temperatures less than normally required in a diffusion weld but with a resultant strength nearly that of a pure diffusion weld between separate sheets.

During the compression step in the enclosure 41, the thin layers of interface metal work not only in the manner of a catalyst but also serve as localized pressure pads to concentrate the pressure applied to the stack of sheets at the nodal regions where a weld is desired.

The welded stack 50 is expanded into a honeycomb structure in any conventional manner such as, for example, by inserting pins in the cells at the top and bottom of the welded stack and pulling the pins apart to expand the stack into the expanded honeycomb structure 55 illustrated in FIG. 5.

As thus far described, a fully useful disclosure has been set forth which may be practiced by anyone skilled in this art and having a knowledge of metallurgical phenomena. However, in order to illustrate the invention more fully, and give further guidance for the complete utilization of the invention, the following examples of material and procedures are given.

*Example 1*

| | |
|---|---|
| Foil material | 18–8 stainless steel. |
| Foil gauge | 0.002″. |
| Interface metal | Iron. |
| Thickness of interface metal | 4–5/10000″. |
| Pattern dimensions: | |
| Node | 4 mm. wide. |
| Antinode | 12 mm. wide. |
| Masking material | Minnesota Mining and Manufacturing Tape No. 470. |

The pattern of masked areas was produced utilizing pressure sensitive tape applied to a stainless steel sheet. The sheet was pickled in 20% hydrochloric acid solution and while still wetted by the acid solution, was deposited in an iron plating bath composed of 500 g./l. ferrous chloride at a pH of approximately 1.0, and iron was electrodeposited on the sheet for 2–3 minutes at a tank voltage of about 3 volts. After washing and drying the sheet and removing the tape, the sheet was cut into 18 sheets each approximately 2″ by 2″ which were stacked together and placed between ½″ thick steel plates. These plates were clamped together with a C-clamp and the assembly placed in an electric furnace heated to 1800° F. for two hours. No protective atmosphere was used. The stack was removed from the furnace and cooled, and it was observed that diffusion welding had taken place along the iron coated lines.

*Example 2*

| | |
|---|---|
| Foil material | 18–8 stainless steel. |
| Foil gauge | 0.002″. |
| Interface metal | Iron. |
| Thickness of interface metal | 5/1,000,000″. |
| Pattern dimensions: | |
| Node | 4 mm. wide. |
| Antinode | 12 mm. wide. |
| Masking material | Minnesota Mining and Manufacturing Tape No. 470. |

A stainless steel sheet was masked and plated using pressure sensitive tape in the same manner as in Example 1 above except that the electroplating step was reduced from 2–3 minutes to approximately 10 seconds. The sheet was prepared and cut into approximately 3″ x 3″ foils in the same manner as described in Example 1 above and these foils were stacked with the node regions of adjacent foils staggered with respect to one another. The stacked foils were placed between steel plates which were first compressed in a hydraulic press and then while under pressure arc welded together in two places. This assembly of compressed sheets was placed in a hydrogen furnace already brought to a temperature of 1000° F. The temperature of the assembly was brought up to and maintained at 1800° F. for two hours before being transferred to a cooling chamber. From the edges of the welded foils strips ½″ wide were cut and the cells in these strips expanded. The welds produced along the node regions were substantially as strong as the foil itself.

Although the foregoing invention has been described in some detail by way of illustration and example for purposes of clarity of understanding, it is understood that certain changes and modifications may be practiced within the spirit of the invention as limited only by the scope of the appended claims.

It is claimed:

1. In the method of making honeycomb core, the steps including electroplating a plurality of spaced, parallel nodes of interface metal on at least one face of a large number of foils, stacking the foils so that the surface of each node contacts the superposed foil and subjecting the stacked foils to heat to raise the temperature of all the foils and simultaneously subjecting said stack to compressional forces to weld the contacted node surfaces and foil surfaces of superposed foils without appreciable attenuation of the foil material.

2. In the method of making honeycomb core, the steps including electroplating on at least one face of a large number of foils a plurality of spaced, parallel nodes of interface metal dissimilar to the metal of said foils, stacking the foils so that the surface of each node contacts the superposed foil and subjecting the stacked foils to heat uniformly to raise the temperature of all the foils and simultaneously subjecting said stack to compressional forces applied uniformly simultaneously throughout the entire stack permanently to weld the contacted node surfaces and foil surfaces of superposed foils without appreciable attenuation of the foil material.

3. In the method of making honeycomb core, the steps including electroplating on at least one face of a large number of foils a plurality of spaced, parallel nodes of interface metal dissimilar to the metal of said foils, stacking the foils so that the surface of each node contacts the superposed foil and subjecting the stacked foils to heat uniformly to raise the temperature of all the foils and simultaneously subjecting said stack to compressional forces to create diffusion welds between foils at said nodes.

4. In the method of making honeycomb core, the steps including electroplating on at least one face of a large number of foils a plurality of spaced parallel nodes of interface metal dissimilar to the metal of said foils, stacking the foils so that the surface of each node contacts the superposed foil with the position of the sets of nodes at the opposite sides of each foil staggered with respect to each other and simultaneously subjecting the stacked foils to heat and pressure to create diffusion welds between adjacent foils at said nodes.

References Cited

UNITED STATES PATENTS

| | | | |
|---|---|---|---|
| 2,330,943 | 10/1943 | Anderson | 204—16 |
| 3,000,088 | 9/1961 | Melzer | 29—157.3 |
| 3,200,489 | 8/1965 | Keeleric | 29—497.5 |
| 3,206,847 | 9/1965 | Keeleric | 29—497.5 |

FOREIGN PATENTS 518,546  11/1955  Canada.

JOHN H. MACK, *Primary Examiner.*

T. TUFARIELLO, *Assistant Examiner.*